(12) United States Patent
Choi

(10) Patent No.: US 6,930,671 B2
(45) Date of Patent: Aug. 16, 2005

(54) METHOD FOR DYNAMICALLY LIGHTENING BACKLIGHTS OF MOBILE COMMUNICATIONS TERMINAL

(75) Inventor: Kyu-Don Choi, Kyoungki-do (KR)

(73) Assignee: Curitel Communications, Inc. (KR)

( * ) Notice: Subject to any disclaimer, the term of this patent is extended or adjusted under 35 U.S.C. 154(b) by 290 days.

(21) Appl. No.: 10/185,119

(22) Filed: Jun. 27, 2002

(65) Prior Publication Data

US 2003/0112216 A1 Jun. 19, 2003

(30) Foreign Application Priority Data

Dec. 13, 2001 (KR) ........................................ 2001-79058

(51) Int. Cl.⁷ ................................................. G09G 5/00
(52) U.S. Cl. ........................................................ 345/169
(58) Field of Search ................................ 345/102, 169, 345/39; 341/22, 27, 31, 34; 379/368, 422, 433.07; 455/566, 567; 340/815.45

(56) References Cited

U.S. PATENT DOCUMENTS

| | | | | |
|---|---|---|---|---|
| 5,337,073 | A | * | 8/1994 | Tsunoda et al. ............. 345/102 |
| 5,398,022 | A | * | 3/1995 | Lipp ........................... 345/102 |
| 5,425,077 | A | * | 6/1995 | Tsoi ............................ 455/566 |
| 6,175,353 | B1 | | 1/2001 | Hoeksma |
| 6,310,609 | B1 | * | 10/2001 | Morgenthaler ................ 341/22 |
| 6,498,600 | B1 | * | 12/2002 | Vance et al. ................. 345/168 |
| 2001/0006390 | A1 | | 7/2001 | Tanabe |
| 2001/0013854 | A1 | | 8/2001 | Ogoro |
| 2001/0027123 | A1 | * | 10/2001 | Ishigaki ....................... 455/566 |
| 2001/0048379 | A1 | * | 12/2001 | Kaikuranta et al. ............. 341/22 |

FOREIGN PATENT DOCUMENTS

| | | |
|---|---|---|
| EP | 0872996 | 4/1998 |
| EP | 1104144 A2 | 5/2001 |
| EP | 1128642 | 8/2001 |
| EP | 1152443 | 11/2001 |
| GB | 2345410 | 12/1998 |
| GB | 2348577 | 2/2000 |
| KR | 1999-0030241 | 7/1999 |
| KR | 2003-42723 | 6/2003 |
| WO | WO 00/21265 | 4/2000 |

* cited by examiner

*Primary Examiner*—Chanh Nguyen
(74) *Attorney, Agent, or Firm*—Blakely Sokoloff Taylor & Zafman

(57) ABSTRACT

The present invention is a method for controlling and emitting backlights of a mobile communications terminal in various operation mode according to a type of interrupts by allocating and coupling general purpose input output of a MODEM chip with each backlights of the mobile communications terminal and controlling each backlight individually. The method for controlling backlights of the0 mobile communications terminal, including steps of: a) detecting various interrupt generated by any operation of the mobile communications terminal; and b) controlling and emitting the backlights individually in a preset operation mode according to the interrupt detected at step a).

5 Claims, 4 Drawing Sheets

METHOD FOR DYNAMICALLY LIGHTENING BACKLIGHTS OF MOBILE COMMUNICATIONS TERMINAL

FIELD OF THE INVENTION

The present invention relates to a mobile communications terminal; and more particularly, to a method for emitting a backlight of the mobile communications terminal in various modes according to a state of the mobile communications terminal such as cases of a busy signal, a call waiting, a call drop, a file download/upload, a chatting and a game, and for reducing power consumption of the mobile communications terminal.

DESCRIPTION OF RELATED ARTS

A wireless communications technology has been incredibly developed recently and, as a result of that, a mobile communications terminal is introduced and widely spread out among people nowadays. Its convenience such as a freedom of locality makes the mobile communications terminal, popular. A backlight used in the mobile communications terminal has been used only for providing the light to a liquid crystal display (LCD) and a keypad of the mobile communications terminal. The backlights of the mobile communications terminal are operated simply according to types of operating the mobile communications terminal such as touching the keypad or opening a folder of the mobile communications terminal. The backlights are simply turned on and off according to the state of the mobile communications terminal. Such a conventional method of emitting the backlight represents only limited states of the mobile communications terminal comparing to various functions of the mobile communications terminal. Such the conventional method may become an unnecessary feature of the mobile communications terminal and increases power consumption.

An enhanced conventional backlight control method automatically turns the backlight off after a pre-fixed time has been elapsed. However, such an automatic backlight off function can be an inconvenience feature when the mobile communications terminal is used in a place without any light.

SUMMARY OF THE INVENTION

It is, therefore, an object of the present invention to provide a method for controlling backlights of a mobile communications terminal individually by allocating and coupling a general purpose input output (GPIO) to each backlight of the mobile communications terminal in one-by-one manner in order to provides various backlight emitting modes according to user operations of the mobile communications terminal and in order to reduce power consumption to emit the backlight.

In accordance with an aspect of the present invention, there is provided a method for controlling backlights of a mobile communications terminal, including steps of: a) detecting and analyzing various interrupts generated by operations of the mobile communications terminal; and b) controlling the backlights individually according to the interrupts detected and analyzed at the step a).

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
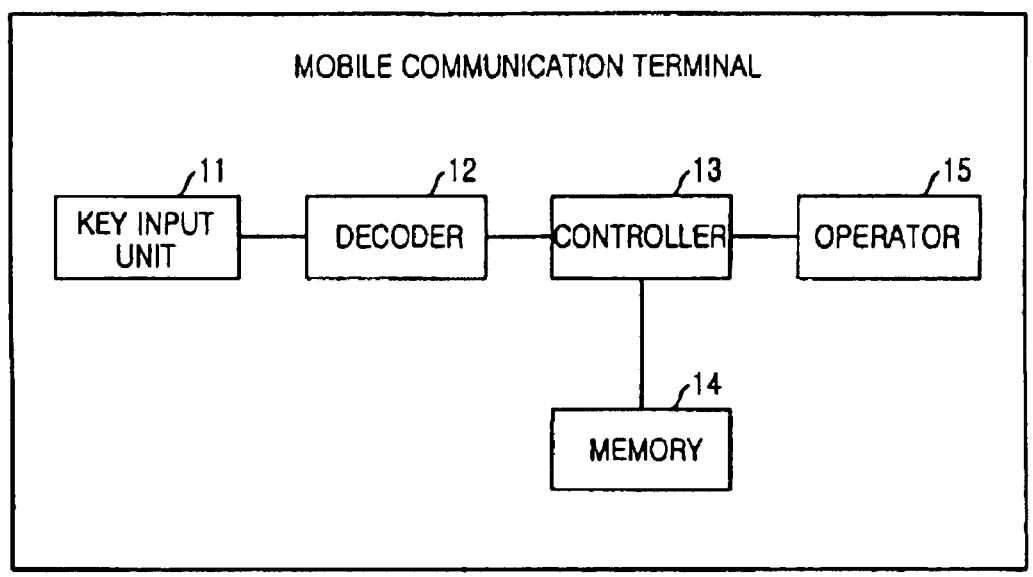
FIG. 1 is a block diagram of a mobile communications terminal in accordance with the present invention.

FIG. 1 is a block diagram configuration of a mobile communications terminal in accordance with the present invention.

Referring to FIG. 1, the inventive mobile communications terminal includes a key input unit 11 for receiving key inputs generated by a user operation of the mobile communications terminal, a decoder 12 for decoding the key inputs provided from the key input unit 11, a controller 13 for generating control signals based on the decoded key inputs from the decoder 12 in order to perform corresponding operations, a memory 14 for storing a program having instructions for operating the backlight of the mobile communications terminal and an operator 15 for performing corresponding operation of the backlights in response to the control signals.

The operation of the backlights in the mobile communications terminal in accordance with the present invention is explained in detail herein below.

At first, when a user operates keys on a keypad of the mobile communications terminal, the key input unit 11 receives key inputs corresponding to user's key operation and passes the key inputs to the decoder 12. The decoder 12 decodes the key inputs and transmits the decoded key inputs to the controller 12.

After then, the controller 12 reads out the operation program from the memory 14 and generates the control signals for performing operations corresponding to the decoded key inputs from the decoder 12. The operator 15 performs correspond operations according to the control signals generated at the controller 13.

As mentioned above, the operator 15 receives the control signals from the controller 13 and controls the backlight of the mobile communications terminal in various modes, e.g., mode 0 to mode 6 shown in a following table, according to the received control signals, each of which represents a state of the mobile communications terminal such as a busy signal, a call waiting, a call drop, a file download/upload, a chatting and a game.

Figure 2A:
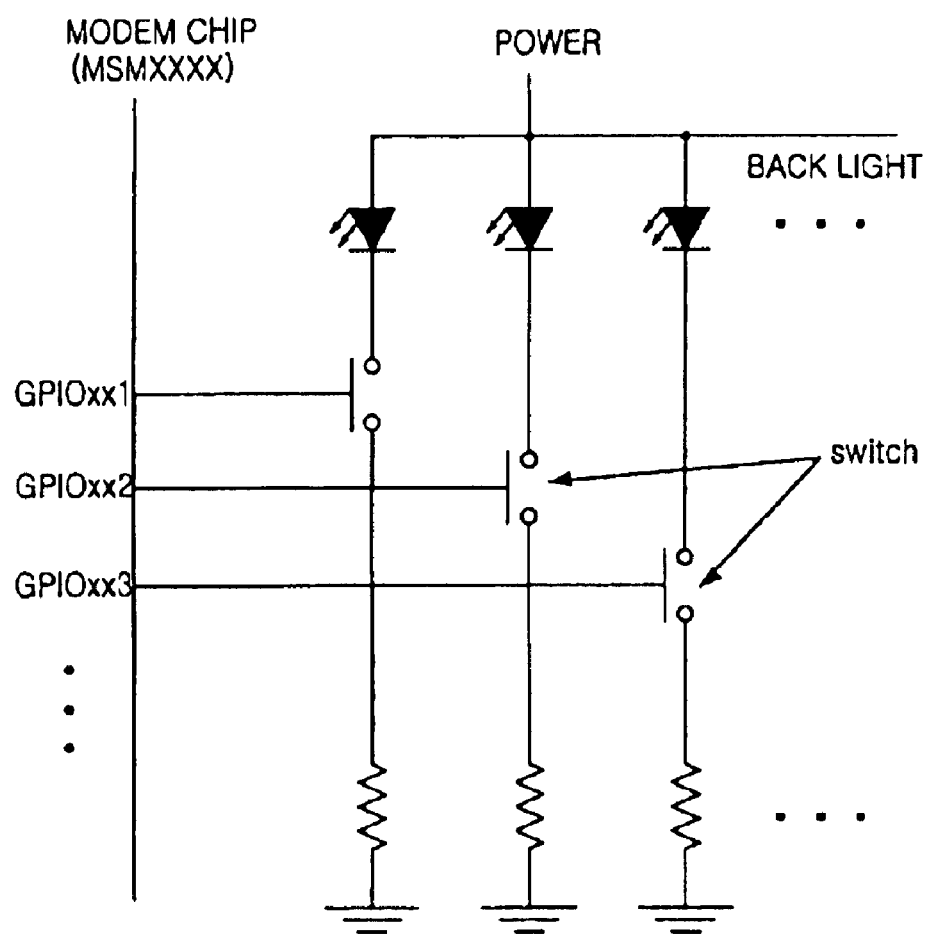
FIG. 2A is a circuit diagram representing the coupling and allocation of a general purpose input output (GPIO) and a backlight of a mobile communications terminal in accordance with the present invention.

FIG. 2A is a circuit diagram representing the coupling and allocation of general purpose input outputs (GPIO) and backlights of a mobile communications terminal in accordance with the present invention.

Referring to FIG. 2A, a plurality of backlights is allocated and connected to corresponding general purpose input outputs (GPIO) in a one-by-one manner and each backlight is individually controlled by its corresponding GPIO.

Generally, six to ten backlights are equipped in the mobile communications terminal and they are coupled and controlled by one or two GPIOs. However, the number of backlights used in the mobile communications terminal is not fixed and in accordance with a preferred embodiment of the present invention, six backlights are used.

For emitting the backlight in various modes, the GPIO is allocated for each backlight in the one-by-one manner. In other words, each backlight is individually controlled by coupling one backlight with one GPIO. However, a backlight located behind an LCD is not controlled by the above-mentioned method for stable display.

Figure 2B:
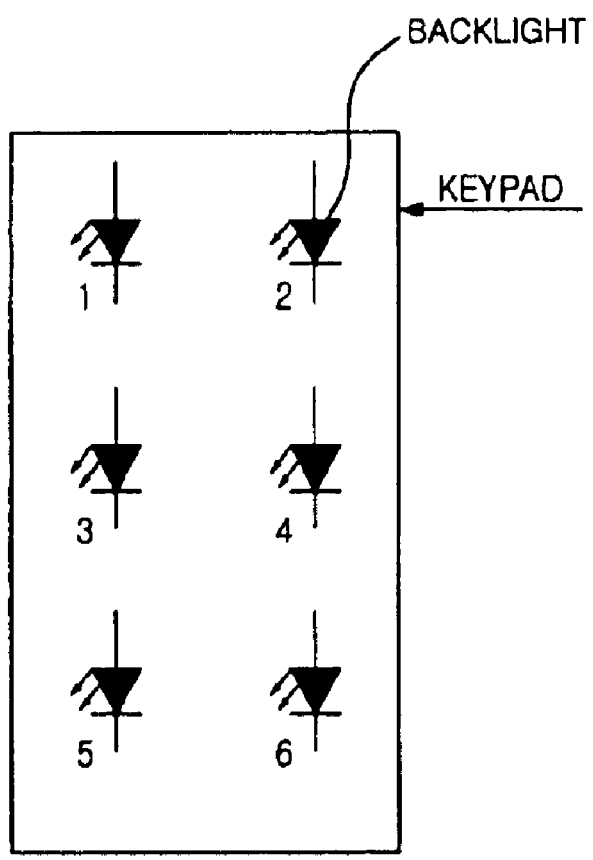
FIG. 2B is a diagram illustrating locations of backlights installed in a keypad in accordance with a preferred embodiment of the present invention.

FIG. 2B is a diagram illustrating locations of backlights installed in a keypad in accordance with a preferred embodiment of the present invention.

In accordance with the preferred embodiment of the present invention, seven modes are used for controlling the backlights. However, the number of modes is not limited to 7 and the number of modes and operation methods can be changed according to the selection of the user or a setting scheme.

The seven modes of emitting the backlights used in the preferred embodiment of the present invention are shown in the following table and explained with reference to FIG. 2B.

TABLE 1

| MODE | ON/OFF state of backlights | Example Case |
| --- | --- | --- |
| 0 | All backlights 1 to 6 are turned OFF | initial state of backlights (folder (or flip) is closed or there is no keypad input for a pre-fixed time) |
| 1 | All backlights 1 to 6 are turned on | Occurrence of keypad input |
| 2 | Backlights are sequentially turned on and off clockwise (e.g., 1-2-4-6-5-3) or counterclockwise (e.g., 3-5-6-4-2-1) | call receiving |
| 3 | Each pair of backlights ((1,2) (3,4) (5,6)) are turned on and off in downward ((1,2) → (3,4) → (5,6) → (1,2)) | file downloading |
| 4 | Each pair of Backlights ((1,2) (3,4) (5,6)) are turned on and off in upward ((5,6) → (3,4) → (1,2) → (5,6)) | accessing to Internet |
| 5 | Each pair of backlights ((1,2) (3,4) (5,6)) are turned on and off upward and downward ((1,2) → (3,4) → (5,6) → (3,4) → (1,2) → 5,6)) | |
| 6 | Each backlight is randomly turned on and off | ending mode or call drop |

Each mode can be repeated preset times or operated for a pre-fixed time, and can be selected appropriately by a user's request.

However, during emitting the backlights corresponding to the above modes, an interrupt generated by receiving a keypad input, receiving a call or receiving an e-mail, or an interrupt caused by the expiration of a timer for a current mode or the ending of programmed repeating times of the current mode. If the interrupt is occurred during executing the current mode, the backlights of the mobile communications terminal are operated by a new mode.

Figure 3:
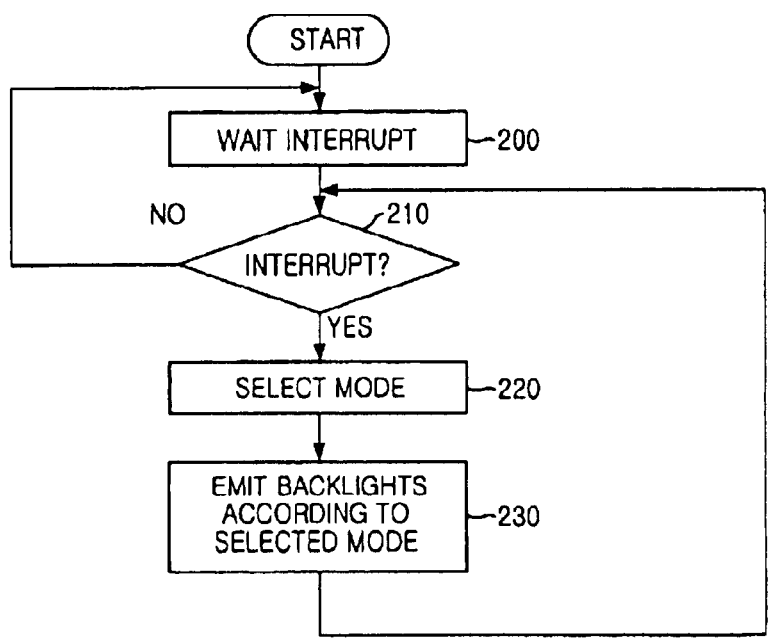
FIG. 3 is a flowchart explaining a method for controlling the backlight of the mobile communications terminal in accordance with a preferred embodiment of the present invention.

FIG. 3 is a flowchart explaining a method for controlling the backlights of the mobile communications terminal in accordance with a preferred embodiment of the present invention.

In FIG. 3, the backlight controlling method is in an initial mode as waiting for the occurrence of an interrupt at step 200.

At step 210, there is checked whether or not any interrupt is occurred.

If there is detected the occurrence of the interrupt at the step 210, a mode corresponding to the detected interrupt is selected at step 220.

Then, the backlights are emitted according to the selected mode at step 230.

During or after emitting the backlights according to the selected mode at the step 230, if another interrupt is occurred, this procedure goes back to the step 210 to repeat the above steps 210 to 230 for another interrupt.

On the other hand, If there is not detected the occurrence of the interrupt at the step 210, this procedure proceeds to the step 200 to wait for the occurrence of another interrupt.

For more accurately understanding the method in accordance with the preferred embodiment of the present invention, specific examples of the method are described hereinafter.

The specific examples are explained with reference to the modes described in [Table 1].

For instance, if an interrupt caused by opening a folder of the mobile communications terminal is occurred, the mode 1 is selected at the step 220. Necessary operations of the mode 1 are performed at the step 230. That is, all backlights of the mobile communications terminal are turned on for five seconds and, then, if there is no other interrupt, an interrupt for selecting mode 6 is generated and detected at the step 210. The mode 6 is selected at the step 220. And then, necessary operations of the mode 6 are performed at the step 230. That is, the backlights of the mobile communications terminal are turned off in a random order. After performing necessary operations at the step 230 and if there is no other interrupt detected, the method goes back to the step 200 to wait for another interrupt.

In a meanwhile, when an interrupt due to the keypad input, the mode 1 or mode 5 is selected according to a user setting at the step 220, wherein the mode 5 consumes less power than the mode 1, and necessary operations for the selected mode are performed at the step 230. During performing the necessary operations of the selected mode, if a "send" button on the keypad of the mobile communications terminal is entered for making a telephone call to other party, the interrupt of entering the "send" button is detected at the step 210. After detecting the interrupt at the step 210, its corresponding mode, which is mode 4, is selected at the step 220 and the backlights are emitted according to the mode 4 at the step 230. If other party answers, another interrupt is detected at the step 210 and its corresponding mode 6 is selected at the step 220. According to the operation of mode 6, all backlights are turned off in a one-by-one manner with a random order at the step 230. During the above-mentioned steps, if mode 1 is executed to turn all backlights on for 5 seconds, an interrupt for selecting mode 5 is automatically occurred and the operation of mode 5 is performed to reduce power consumption. It is a power consumption mode and can be set by the user.

In case that an interrupt for receiving a message or e-mail is generated, mode 6 is selected at the step 220 and its corresponding operation is performed at the step 230. If the user does not read the message or e-mail, mode 6 is selected at the step 220 and its corresponding operation is performed at the step 230 for every certain period.

In case of closing folder of the mobile communications terminal during performing the operation of each mode, an interrupt for selecting mode 0 is generated and detected at the step 210 and its corresponding operation is performed at the step 230.

The above-mentioned operations are one example for explaining the preferred embodiment of the present invention and the operation of each mode and the scheme of selecting modes can be programmed by either a mobile communications terminal user or a mobile communications terminal manufacturer.

The above-mentioned present invention can provide a method for emitting the backlight of the mobile communications terminal in various modes according to the states of the mobile communications terminal such as a busy signal, a call waiting and a call drop, a file download/upload, a chatting and a game by allocating the GPIOs to the backlights in one-by-one manner and controlling each backlight individually.

Also, the present invention can provide convenience to the user to distinguish the respective states of the mobile communications terminal by seeing a way of emitting the backlights and it can reduce power consumption by emitting smaller number of backlights according to the states of mobile communications terminal compared to the conventional method.

While the present invention has been described with respect to certain preferred embodiments, it will be apparent to those skilled in the art that various changes and modifications may be made without departing from the scope of the invention as defined in the following claims.

What is claimed is:

1. A method for controlling backlights of a mobile communications terminal, comprising steps of:
    a) detecting various interrupts generated by operations of the mobile communications terminal;
    b) analyzing the detected interrupts and generating a controlling signal representing a state of the mobile communication terminal; and
    c) controlling the backlights individually according to the control signal,
        wherein the step c) includes the steps of:
        c1) selecting as preset operation mode according to the control signal; and
        c2) emitting the backlights individually according to the selected preset operation mode,
            wherein the preset operation mode includes:
            a first operation mode for turning all backlights off in an initial state;
            a second operation mode for turning all backlights on in a key input state which represents occurrence of keypad input;
            a third operation mode for sequentially turning each of backlights in a clockwise direction in a call receiving state which represents receipt of calls;
            a fourth operation mode for sequentially turning backlights on and off in a downward direction in a file downloading state which represents downloading files;
            a fifth operation mode for sequentially turning backlights on and off in a upward direction in an Internet state which represents access of Internet; and
            a sixth operation mode for randomly turning backlights on and off in an ending state which represents turning off of the mobile communication terminal and a call drop state which represents call dropping.

2. The method as recited in claim 1, wherein the various interrupts are generated in cases of opening a folder of the mobile communications terminal, entering no keypad input during a certain time, receiving a telephone call, receiving a message or e-mail, downloading a file, uploading a file and closing the folder of the mobile communications terminal.

3. The method as recited in claim 1, wherein the preset operation mode defines backlight operating schemes including an order of turning each backlight on, an order of turning each backlight off and a duration time for emitting the backlights according to the control signal representing the state of the mobile communication terminal, wherein the present operation modes previously are set by a user of the mobile communications terminal.

4. The method as recited in claim 1, wherein each of the backlights is connected to general purpose input output (GPIO) ports in a one-by-one manner and each of the backlights is individually controlled.

5. The method as recited in claim 1, wherein the number of the backlights is 6.

* * * * *